United States Patent
Mohlin et al.

(10) Patent No.: US 12,218,326 B2
(45) Date of Patent: Feb. 4, 2025

(54) TEMPERATURE CONTROL SYSTEM, A VEHICLE PROVIDED THEREWITH AND A METHOD FOR CONTROLLING THE OPERATION THEREOF

(71) Applicant: Scania CV AB, Södertälje (SE)

(72) Inventors: Martin Mohlin, Stockholm (SE); Ola Hall, Stockholm (SE)

(73) Assignee: Scania CV AB, Södertälje (SE)

( * ) Notice: Subject to any disclaimer, the term of this patent is extended or adjusted under 35 U.S.C. 154(b) by 228 days.

(21) Appl. No.: 17/912,161

(22) PCT Filed: Mar. 16, 2021

(86) PCT No.: PCT/SE2021/050228
§ 371 (c)(1),
(2) Date: Sep. 16, 2022

(87) PCT Pub. No.: WO2021/194406
PCT Pub. Date: Sep. 30, 2021

(65) Prior Publication Data
US 2023/0128939 A1    Apr. 27, 2023

(30) Foreign Application Priority Data

Mar. 23, 2020  (SE) .................................. 2050313-2

(51) Int. Cl.
*B60H 1/00*    (2006.01)
*F28F 27/00*   (2006.01)
(Continued)

(52) U.S. Cl.
CPC ........... *H01M 10/625* (2015.04); *F28F 27/00* (2013.01); *H01M 10/613* (2015.04); *F28F 2250/08* (2013.01); *H01M 2220/20* (2013.01)

(58) Field of Classification Search
CPC ............. H01M 10/625; H01M 10/613; H01M 2220/20; F28F 27/00; F28F 2250/08
(Continued)

(56) References Cited

U.S. PATENT DOCUMENTS 9,643,469 B2   5/2017 Kakehashi et al.
2001/0045103 A1  11/2001 Khelifa
(Continued)

FOREIGN PATENT DOCUMENTS

CN  104093587 A  10/2014
CN  108128177 A  6/2018
(Continued)

OTHER PUBLICATIONS

SCANIA CV AB, European Patent Application No. 21776474.5, Extended European Search Report, Mar. 27, 2024.
(Continued)

*Primary Examiner* — Davis D Hwu
(74) *Attorney, Agent, or Firm* — Moore & Van Allen PLLC; W. Kevin Ransom (57) ABSTRACT

A temperature control system for a vehicle, comprising a main circuit comprising a tubing in which there is provided a coolant, a main circuit pump configured to pump said coolant through the tubing in a first direction. Connected in parallel to the main circuit are first and second sub-circuits for cooling or heating of components connected thereto. In the sub-circuits there are provided first and second pumps that pump coolant through said sub-circuits from a first end to second end at which the respective sub-circuit is connected the main circuit. The first end is upstream the second end as seen in the first direction in the first circuit, and the first end of the first sub-circuit and the first end of the at least
(Continued)

one second sub-circuit are joined to a common tubing section which in its turn is connected to the tubing of the main circuit.

17 Claims, 3 Drawing Sheets

(51) Int. Cl.
    *H01M 10/613*     (2014.01)
    *H01M 10/625*     (2014.01)
(58) Field of Classification Search
    USPC .......................................................... 165/203
    See application file for complete search history.

(56) References Cited

U.S. PATENT DOCUMENTS

| | | |
|---|---|---|
| 2013/0164593 A1 | 6/2013 | Burrows et al. |
| 2013/0167784 A1 | 7/2013 | Quix et al. |
| 2015/0315956 A1 | 11/2015 | Alm et al. |
| 2016/0031288 A1 | 2/2016 | Nishikawa et al. |
| 2016/0238327 A1 | 8/2016 | Lotha |
| 2016/0285145 A1 | 9/2016 | Flahaut et al. |
| 2018/0015839 A1 | 1/2018 | Ito et al. |
| 2018/0154734 A1 | 6/2018 | Lee |
| 2018/0163607 A1 | 6/2018 | Uto et al. |
| 2018/0175340 A1 | 6/2018 | Karulkar et al. |
| 2019/0070951 A1 | 3/2019 | Lucke et al. |
| 2019/0264600 A1 | 8/2019 | Loof et al. |
| 2019/0375270 A1 | 12/2019 | Boger et al. |
| 2020/0063636 A1* | 2/2020 | Quix .................. F02F 1/16 |

FOREIGN PATENT DOCUMENTS

| | | |
|---|---|---|
| CN | 109362232 A | 2/2019 |
| DE | 102015200334 A1 | 7/2016 |
| DE | 102018207852 A1 | 11/2019 |
| DE | 102019207993 A1 | 12/2019 |
| EP | 2097628 B1 | 9/2018 |
| EP | 3514850 A1 | 7/2019 |
| FR | 2799505 A1 | 4/2001 |
| WO | 2017213573 A1 | 12/2017 |

OTHER PUBLICATIONS

SCANIA CV AB, International Patent Application No. PCT/SE2021/050228, International Search Report, Apr. 6, 2021.
SCANIA CV AB, International Patent Application No. PCT/SE2021/050228, Written Opinion, Apr. 6, 2021.
SCANIA CV AB, Swedish Patent Application No. 2050313-2, Office Action, Nov. 2, 2020.
SCANIA CV AB, International Patent Application No. PCT/SE2021/050228, International Preliminary Report on Patentability, Sep. 22, 2022.
SCANIA CV AB, Chinese Patent Application No. 202180014625.1, Second Office Action, Jul. 25, 2024.
SCANIA CV AB, Chinese Patent Application No. 202180014625.1, First Office Action, Apr. 23, 2024.

\* cited by examiner

TEMPERATURE CONTROL SYSTEM, A VEHICLE PROVIDED THEREWITH AND A METHOD FOR CONTROLLING THE OPERATION THEREOF

CROSS-REFERENCE TO RELATED APPLICATION(S)

This application is a National Stage Patent Application (filed under 35 § U.S.C. 371) of PCT/SE2021/050228, filed Mar. 16, 2021, of the same title, which, in turn claims priority to Swedish Patent Application No. 2050313-2 filed Mar. 23, 2020, of the same title; the contents of each of which are hereby incorporated by reference.

FIELD OF THE INVENTION

The present invention relates to a temperature control system for a vehicle, comprising
  a. a main circuit comprising a tubing in which there is provided a coolant, a main circuit pump configured to pump said coolant through the tubing of the main circuit in a first direction, and at least one unit for cooling or heating the coolant in the main circuit,
  b. a first sub-circuit for cooling or heating a first component, said first sub-circuit comprising a tubing that has a first end and a second end, which are connected to respective openings in the tubing of the main circuit at positions that are spaced apart from each other as seen in a longitudinal direction of the tubing of the main circuit, wherein the first end is connected to the tubing of the main circuit at a position upstream the position at which the second end is connected to the tubing of the main circuit as seen in said first direction, and
    at least one second sub-circuit for cooling or heating a second component, said second sub-circuit comprising a tubing that has a first end and a second end, which are connected to respective openings in the tubing of the main circuit at positions that are spaced apart from each other as seen in a longitudinal direction of the tubing of the main circuit, wherein the first end is connected to the tubing of the main circuit at a position upstream the position at which the second end is connected to the tubing of the main circuit as seen in said first direction, wherein
  c. the first sub-circuit comprises a first pump configured to pump a coolant in a direction from said first end of the tubing of the first sub-circuit to the second end thereof, and
  d. the second sub-circuit comprises a second pump configured to pump a coolant in a direction from said first end of the tubing of the second sub-circuit to the second end thereof.

The present invention also relates to a vehicle provided with a temperature control system as defined in this application.

The present invention also relates to a method of controlling the operation of a temperature control system according to the invention.

BACKGROUND

When designing any coolant system which involves multiple components it is always a struggle to ensure enough flow and coolant temperature to all components. Connecting the components in series allows for the same coolant flow to all components. However as the coolant gets warmer from each component it will cool the following components less and less. If, as an alternative, the components are connected in a parallel flow the coolant temperature will be the same. However, the flow rate depends on the pressure drop of the components and lengths and diameters of hoses/pipes. It is therefore an objective to find an installation which gives the required coolant flow rate and coolant temperature to all components, the temperature of which is controlled by means of heat exchange with the coolant.

In contemporary coolant systems for vehicles most coolant systems utilizes a single pump and tries to balance the properties of all components until they find a setup which works and requires as little of over-dimensioning of the pump as possible. Using a bigger pump to increase the coolant flow rate or using a bigger radiator in order to achieve more powerful cooling of the coolant is always a solution but will also induce extra costs and extra space.

For battery installations, for example provided in a vehicle as a power source of the vehicle, it is important to ensure equal cooling of all batteries. For this purpose the batteries may require the same temperature on the coolant and the same coolant flow rate. This can be solved by placing the batteries close to each other, dimensioning the coolant pump for the given amount of batteries and arranging the tubing in parallel circuits. However this requires the batteries to be close to each other, and whenever a further battery is added to the installation, the existing pump, if not over-dimensioned, will need to be substituted to a more powerful one. Prior art solutions are thus not easily adapted to changing set ups of components that need to be cooled, or heated, by the coolant in the temperature control system.

Occasionally, there may be a need of delivering different degrees of cooling to different components in a temperature cooling system. In a system having a single pump and a plurality of parallel cooling circuits into which the coolant is pumped by said pump, such differential cooling is then solved by means of flow-regulating valves provided in the respective circuit.

SUMMARY OF THE INVENTION

It is an object of the present invention to present a temperature control system that reduces the above-mentioned drawbacks of prior art and that presents an alternative solution to existing solutions. The temperature control system shall be designed so as to enable delivery of coolant of generally the same temperature to the components of the respective sub-circuits.

The object of the invention is achieved by means a temperature control system as defined hereinabove and in the preamble of claim 1, which system is characterized in that
  the first end of the first sub-circuit and the first end of the at least one second sub-circuit are joined to a common tubing section which in its turn is connected to the tubing of the main circuit.

For each added component to be cooled, a further sub-circuit as defined hereinabove may be added. No substitution of the pump of the main circuit may be needed in order to adapt the system to such addition of components. Different coolant flow rates can easily be achieved for the different sub-circuits by individual control of the respective pump of the sub-circuits. In those operational states in which the sum of coolant pumped by the pumps, i.e. the output, of the sub-circuits is larger than the amount of coolant pumped by the main circuit pump, there will be a return flow of coolant in a section of the main circuit between the inlet to the sub-circuits, defined by the common tubing section, and the outlets of the sub-circuits. Provided that there is a flow of coolant from the main circuit pump, the coolant from the main circuit pump will mix with the coolant of the return flow in the common tubing section, and the temperature of the coolant delivered from the common tubing section to the different sub-circuits will be generally the same. A separate connection point of each inlet of the sub-circuits to the tubing of the main circuit would, on the other hand, result in a different temperature of the coolant delivered to the different sub-circuit.

The term "upstream" is used for defining a position of a component relative to another component along the tubing of the main circuit. The outlet of the main circuit pump is herein used as a reference position. Thus, by a first component being upstream a second component is herein meant that the first component is arranged closer to the outlet of the main circuit pump than the second component from a connection point of view.

The term "tubing" as applied in this disclosure should be regarded in a wide sense and may include all sorts of structural elements that define a channel through which a coolant may flow. A tubing as used in this disclosure may also comprise a plurality of structural elements that together define the tubing, said structural elements not necessarily having the traditional geometric tubular shape of a tube.

According to one embodiment, said common tubing section has a length which is sufficient for mixing in said common tubing a flow of coolant delivered by the main circuit pump and a flow of coolant delivered by said first pump of the first sub-circuit and by said second pump of the at least one second sub-circuit such that the temperature of the coolant is homogenous at an end of the common tubing where the first and second sub-circuits depart from each other.

According to one embodiment, the temperature control system comprises a control unit, wherein, at least in one mode of operation, the control unit is configured to control the output, as measured in volume per time unit, of the main circuit pump, the first pump of the first sub-circuit and the second pump of the at least one second sub-circuit, such that the sum of the output of the first pump of the first sub-circuit and the output of the second pump of the at least one second sub-circuit exceeds the output of the main circuit pump. Thereby, the return flow of coolant in a section of the main circuit described above is achieved.

According to one embodiment, the temperature control system comprises:
  a first sensor configured to measure a parameter reflecting the temperature t1 of said first component,
  a second sensor configured to measure a parameter reflecting the temperature t2 of said second component, and
  a control unit which is connected to the first sensor and to the second sensor and which is configured to control the operation of the first pump on basis of input received from the first sensor and to control the operation of the second pump on basis of input received from the second sensor.

The parameter reflecting the temperature may be the temperature itself (direct measurement) or any other parameter, such as a property of the component that reflects its temperature, for example electric current flowing through the component (indirect measurement). The control unit may be configured to make a temperature prediction based on repeated measurements by each sensor and thus to control the respective pump not only on basis of the momentary temperature indication but also on basis of a temperature change trend.

According to one embodiment, the control unit is connected to the pump of the main circuit and to the at least one unit for cooling or heating the coolant in the main circuit and is configured to control the operation of the pump of the main circuit and said unit for cooling or heating the coolant in the main circuit on basis of input received from the first sensor and the second sensor.

According to one embodiment, the control unit is configured to activate the pump of the main circuit and/or said unit for cooling or heating the coolant in the main circuit, as a response to input received from said first or second sensor, or from a sensor that measures the temperature of the coolant in the first sub-circuit and the second sub-circuit, that indicates that sufficient heating or cooling of the first component or second component is not achieved by control of the first and second pump.

According to one embodiment, the pump of the main circuit has a lower maximum output, measured in liters per minute, than the sum of the maximum output of the first and second pumps.

According to one embodiment, a portion of the tubing of the main circuit that presents the openings to which the first and second ends of the first and second sub-circuits are connected is separable from an upstream part of said tubing and a downstream part of said tubing by means of tubing connections via which it is connected to said upstream part and downstream part respectively. Said portion may thus be provided as an add-on component that could be added to an already existing system, which could then be provided with sub-circuits in accordance with the teaching of the present invention. Different such add-on portions, provided with different numbers openings could be provided depending on the number of components that are to be cooled or heated by the temperature control system.

According to one embodiment, said first component and said second component are components of a vehicle.

According to one embodiment, at least one of the first component and the second component is a battery for the accumulation of electric energy.

According to one embodiment, the first component has a preferred operation temperature range a-b, and the second component has a preferred operation temperature range c-d, and that a-b overlaps c-d.

The invention also relates to a vehicle, comprising a first component which has a preferred operating temperature range a-b, and at least one second component which has a preferred operating temperature range c-d, said vehicle being characterized in that it comprises a temperature control system according to the present invention, wherein the first component is provided in connection to the first sub-circuit and configured to be heated or cooled by heat exchange with coolant flowing through the first sub-circuit, and wherein the second component is provided in connection to the second sub-circuit and configured to be heated or cooled by heat exchange with coolant flowing through the second sub-circuit.

According to one embodiment, said first component and second component is any one of
  a battery for accumulation of electric energy,
  a compressor,
  an electric heater device,
  a condenser,
  power electronics.

According to one embodiment, at least one of the first and second component is a battery for the accumulation of electric energy.

The invention also relates to a method of controlling the operation of a temperature control system as defined hereinabove or hereinafter, comprising the following steps:

- measuring a parameter reflecting the temperature t1 of a first component,
- comparing the measured parameter to a preferred operational temperature range a-b of the first component,
- controlling the output of the first pump on basis of said comparison such that $a<t1<b$,
- measure a parameter reflecting the temperature t2 of a second component,
- comparing the measured parameter to a preferred operational temperature range c-d of the second component,
- controlling the output of the second pump on basis of said comparison such that $c<t2<d$, and
- repeating said steps continuously.

The method is preferably implemented by use of a control unit provided with a computer program comprising a computer program code causing a computer to implement the method as disclosed hereinabove or hereinafter. The control unit preferably defines a computer program product that comprises storage medium which can be read by a computer and on which the program code is stored.

According to one embodiment, the method also comprises the following step.

- if any of the conditions $a<t_1<b$ or $c<t_2<d$ is not achieved by means of control of the output of the first pump or the second pump, controlling the operation of the pump of the main circuit and the operation of the unit for cooling or heating the coolant in the main circuit in addition to controlling the output of the first and second pump such that $a<t_1<b$ and $c<t_2<d$.

Further features and advantages of the present invention are presented in the following detailed description of an embodiment.

BRIEF DESCRIPTION OF THE DRAWINGS

An embodiment of the present invention will now be described more in detail, by way of example, with reference to the drawing, on which.

DETAILED DESCRIPTION OF EMBODIMENTS

Figure 1:
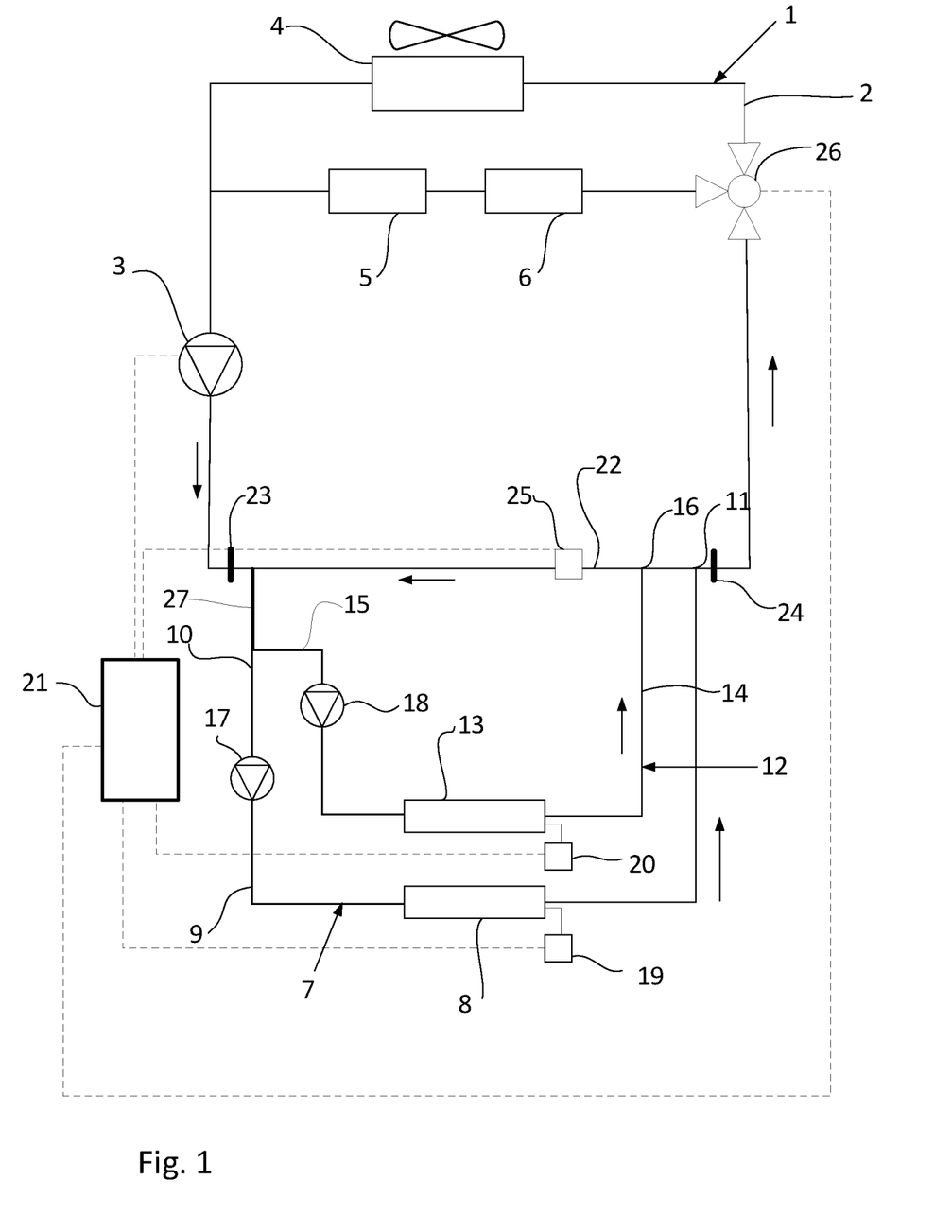
FIG. 1 is a schematic representation of temperature control system according to the invention.

FIG. 1 is a schematic representation of a temperature control system according to the present invention. Preferably the temperature control system is arranged in a vehicle, such as a bus or truck, for the purpose of heating or cooling components, including masses of gas and/or masses of liquid. According to one embodiment, the temperature control system is configured to cool a plurality of batteries which are configured to operate as accumulators of electric energy and to act as an energy storage which is used for feeding one or more electric motors/engines configured for the propulsion of the vehicle.

The temperature control system comprises a main circuit 1 comprising tubing 2 in which there is provided a coolant.

The system further comprises a main circuit pump 3 configured to pump said coolant through the tubing 2 of the main circuit 1 in a first direction, shown with an arrow in FIG. 1. The temperature control system also comprises at least one unit 4, 5, 6 for cooling or heating the coolant in the main circuit 1. Said unit 4, 5, 6 may comprise a fan-cooled radiator 4, a heater 5 and/or a cooler 6. The cooler 6 may comprise an evaporator via which the coolant exchanges heat with a refrigerant of a cooling system provided with a compressor, a condenser and said evaporator. In the shown embodiment, the radiator 4 is connected in parallel with the heater 5 and the cooler 6. A directing valve 26 is provided for controlling coolant flow to the radiator 4 and the heater 5 and cooler 6. Other set ups and arrangements are of course conceivable. For example, the unit for heating or cooling may comprise at least one further circuit from which coolant of predetermined temperature is introduced into the main circuit. Such further circuits then, per definition, becomes part of the main circuit disclosed in this application.

In addition to the main circuit 1, the temperature control system also comprises a first sub-circuit 7 for cooling or heating a first component 8, said first sub-circuit comprising a tubing 9 that has a first end 10 and a second end 11, which are connected to respective openings in the tubing 2 of the main circuit at positions that are spaced apart from each other as seen in a longitudinal direction of the tubing of the main circuit. The first end 10 is connected to the tubing 2 of the main circuit 1 at a position upstream the position at which the second end 11 is connected to the tubing 2 of the main circuit 1 as seen in said first direction.

The temperature control system also comprises a second sub-circuit 12 for cooling or heating a second component 13, said second sub-circuit 12 comprising a tubing 14 that has a first end 15 and a second end 16, which are connected to respective openings in the tubing 2 of the main circuit 1 at positions that are spaced apart from each other as seen in a longitudinal direction of the tubing of the main circuit 1. The first end 15 is connected to the tubing 2 of the main circuit 1 at a position upstream the position at which the second end 16 is connected to the tubing 2 of the main circuit 1 as seen in said first direction.

According to one embodiment, the first component 8 has a preferred operational temperature range a-b, and the second component 13 has a preferred operational temperature range c-d, wherein a-b overlaps c-d.

There is also provided a sensor 25 for sensing the temperature of the coolant in a section of the main circuit situated between the common tubing section 27 and the second ends 11, 16 of the first and second sub-circuits 7, 12. Alternatively the sensor 25 is supplemented or replaced by corresponding sensors arranged for the measurement of the coolant temperature in the common tubing section 27 or in the first and second sub-circuits 7, 12 downstream the first ends 10, 15 of the first and second sub-circuits 7, 13, but upstream the first and second components 8, 13 as seen in the flow directions generated in the first and second sub-circuits 7, 12.

Further to the above-mentioned features, the first sub-circuit 7 comprises a first pump 17 configured to pump a coolant in a direction from said first end 10 of the tubing 9 of the first sub-circuit 7 to the second end 11 of the first sub-circuit 7.

The second sub-circuit 12 comprises a second pump 18 configured to pump a coolant in a direction from said first end 15 of the tubing 14 of the second sub-circuit 12 to the second end 16 of the second sub-circuit 12.

The first end 10 of the first sub-circuit 7 and the first end 15 of the second sub-circuit 12 are joined to a common tubing section 27 which in its turn is connected to the tubing 2 of the main circuit 1.

The common tubing section 27 has a length which is sufficient for mixing in said common tubing section 27 a flow of coolant delivered by the main circuit pump 3 and a flow of coolant delivered by said first pump 17 of the first sub-circuit 7 and by said second pump 18 of the second sub-circuit 12 such that the temperature of the coolant is homogenous, i.e. equal over a cross section of the common tubing section 27, at an end of the common tubing section 27 where the first and second sub-circuits 7, 12 depart from each other.

The temperature control system further comprises a control unit 21. At least in one mode of operation, the control unit is configured 21 to control the output, as measured in volume per time unit, of the main circuit pump 3, the first pump 17 of the first sub-circuit 7 and the second pump 18 of the second sub-circuit 12, such that the sum of the output of the first pump 17 of the first sub-circuit 7 and the output of the second pump 18 of the second sub-circuit 12 exceeds the output of the main circuit pump 3.

Figure 2:
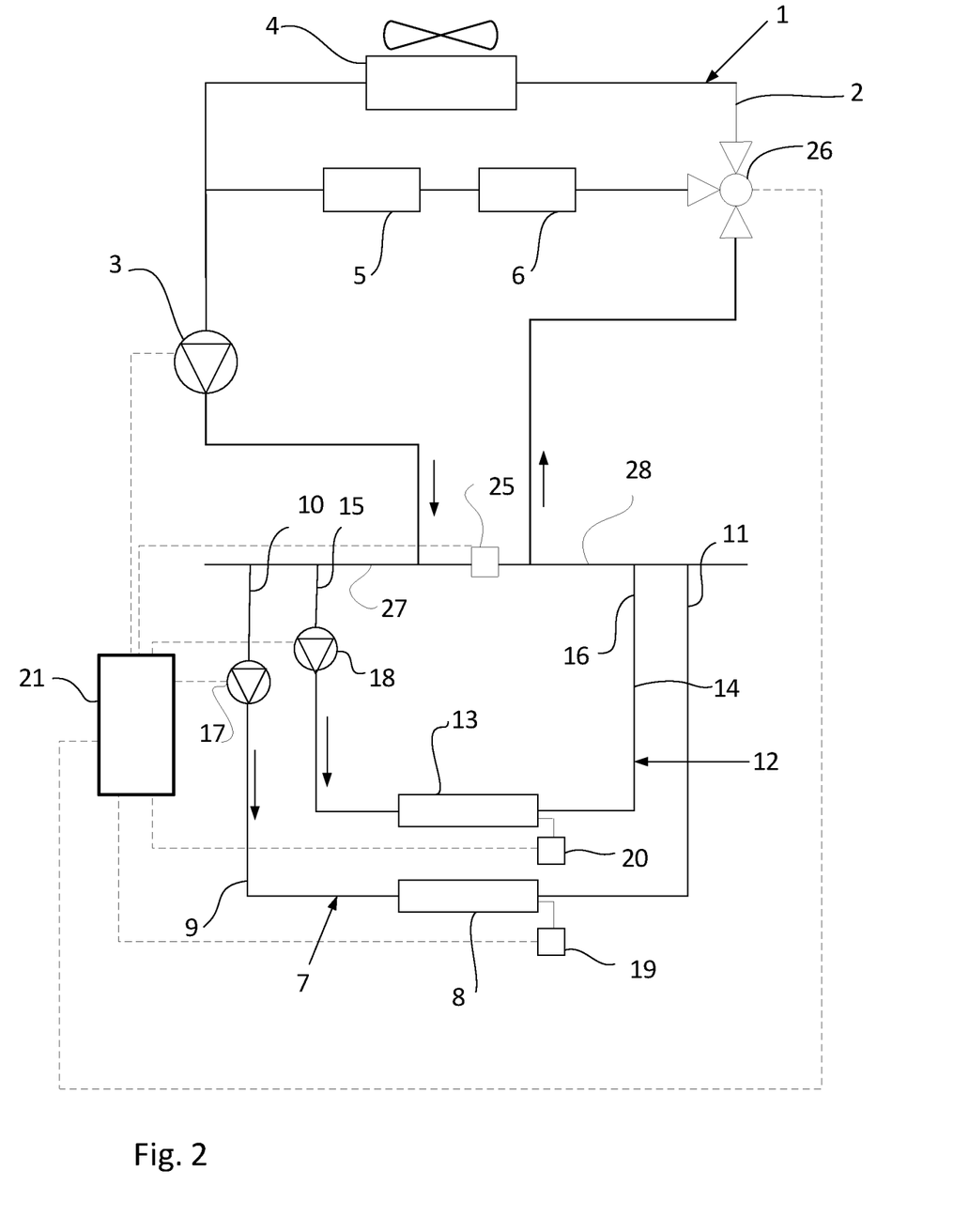
FIG. 2 is a schematic representation of an alternative embodiment and FIG. 3 is a flow chart showing essential steps of an embodiment of the method according to the present invention.

In the alternative embodiment shown in FIG. 2, the second end 11 of the first sub-circuit 7 and the second end 16 of the second sub-circuit 12 are joined to a second common tubing section 28 which in its turn is connected to the tubing 2 of the main circuit 1.

The temperature control system further comprises a first sensor 19 configured to measure a parameter reflecting the temperature t1 of said first component 8 and, a second sensor 20 configured to measure a parameter reflecting the temperature t2 of said second component 13. The control unit 21 is connected to the first sensor 19 and to the second sensor 20 and is configured to control the operation of the first pump 17 on basis of input received from the first sensor 19 and to control the operation of the second pump 18 on basis of input received from the second sensor 20.

The control unit 21 is connected to the pump 3 of the main circuit 1 and to the at least one unit 4, 5, 6 for cooling or heating the coolant in the main circuit 1 and is configured to control the operation of the pump 3 of the main circuit 1 and said unit 4, 5, 6 for cooling or heating the coolant in the main circuit 1 on basis of input received from the first sensor 19 and the second sensor 20. The control unit 21 is also connected to and configured to control the directing valve 26.

The control unit 21 is configured to activate the pump 3 of the main circuit 1 and/or said unit 4, 5, 6 for cooling or heating the coolant in the main circuit 1, as a response to input received from said first or second sensor 19, 20 that indicates that sufficient heating or cooling of the first component 8 or second component 13 is not achieved by control of the first and second pump 17, 18.

A portion 22 of the tubing 2 of the main circuit 1 that presents the openings to which the first and second ends 10, 11, 15, 16 of the first and second sub-circuits 8, 12 are connected via the common tubing section 27 of the first ends 10, 15 (FIGS. 1 and 2) and the common tubing section 28 of the second ends 11, 16 (FIG. 2) is separable from an upstream part of said tubing and a downstream part of said tubing 2 by means of tubing connections 23, 24 via which it is connected to said upstream part and downstream part respectively. The portion 22 carrying said openings thus forms an easily replaceable unit which can be replaced to another corresponding unit with another setup of openings, depending on the need.

According to some embodiments, the tubing connections 23, 24 may comprise one or more of a threaded connection, an o-ring, a gasket, a snap-fit arrangements, and the like. Moreover, according to some embodiments, the tubing connections 23, 24 may be be soldered, welded, glued, attached via vibration welding of plastic, or the like. The distance between the pump 3 of the main circuit 1 and a tubing connection 23 may be large or may be short. According to some embodiments, a tubing connection 23 may be attached directly onto an outlet conduit of the pump 3 of the main circuit 1.

Figure 3:
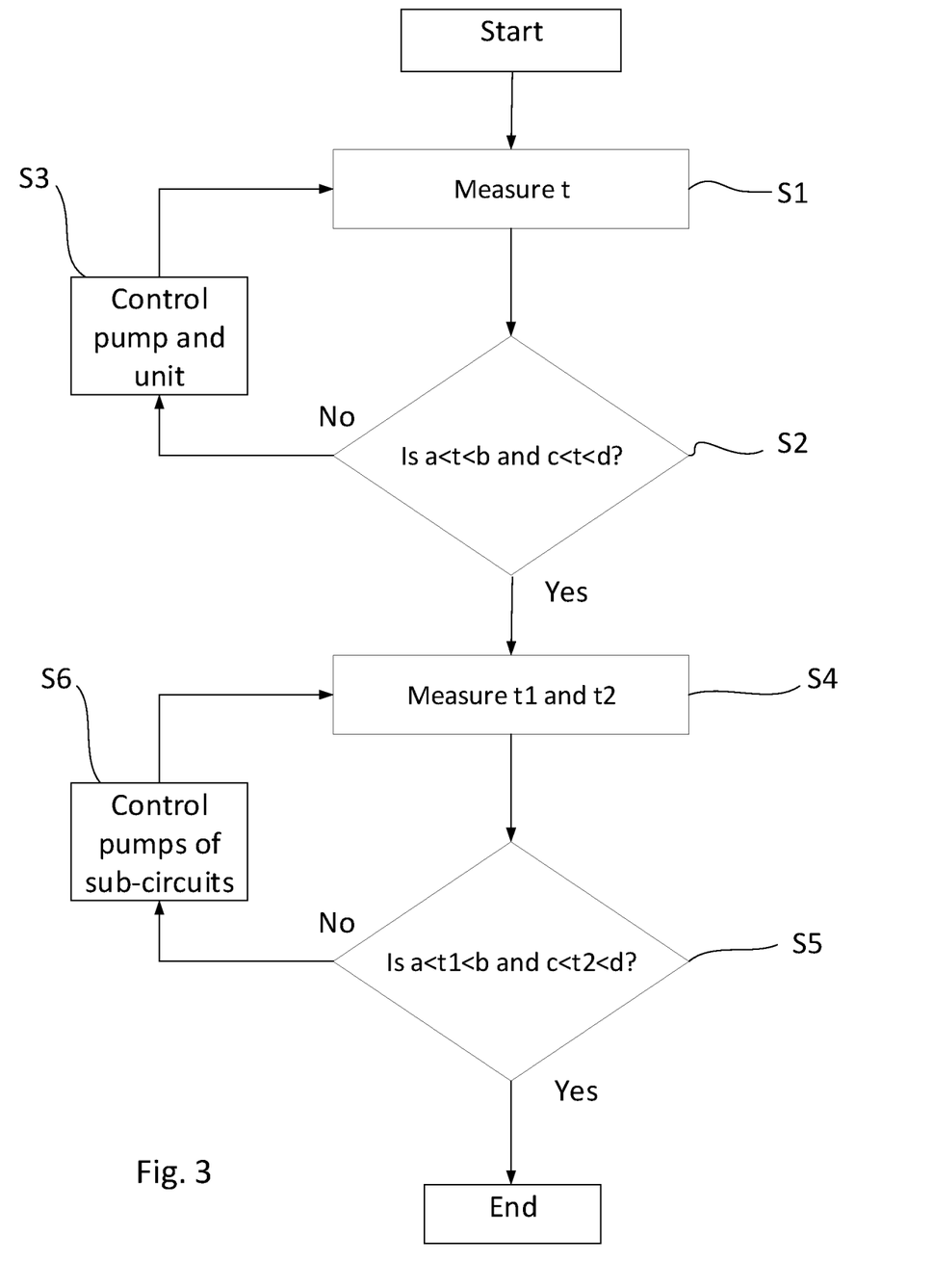

FIG. 3 shows a flow chart in which steps of the method according to the present invention is presented. The method comprises the following steps:

Measuring the temperature t of the coolant downstream the second ends 11, 16 of the first and second sub-circuits 7, 12 as seen in said first direction, either by measurement in said mixing zone and/or by individual measurement of the coolant temperature in the first and second sub-circuits 7, 12 downstream the first ends 10, 15 of the first and second sub-circuits 7, 12, but upstream the first and second components 8, 13, box S1.

Comparing the measured coolant temperature t with a preferred operational temperature range a-b of the first component 8 and with a preferred operation temperature range c-d of the second component 13, box S2.

If the measured coolant temperature t is outside the ranges a-b and/or c-d, then operation of the pump 3 of the main circuit 1 and said unit 4, 5, 6 for cooling or heating the coolant in the main circuit 1 should be controlled such that the measured coolant temperature t becomes inside said ranges a-b and c-d, box S3.

Measuring a first parameter reflecting the temperature $t_1$ of the first component 8 in the first sub-circuit, and measuring a second parameter reflecting the temperature $t_2$ of the second component 13 in the second sub-circuit, box S4.

Comparing the temperature $t_1$ reflected by the first measured parameter to the preferred operational temperature range a-b of the first component 8, to determine if $a<t_1<b$, and comparing the temperature $t_2$ reflected by the second measured parameter to the preferred operation temperature range c-d of the second component 13 to determine if $c<t_2<d$, box S5.

If $a<t_1<b$ is not fulfilled, controlling the output of the first pump 17 of the first sub-circuit 7 on basis of said comparison such in order to obtain that $a<t_1<b$, and if $c<t_2<d$, controlling the output of the second pump 18 on basis of said such that $c<t_2<d$, box S6.

These steps are preferably performed by the action of the control unit 21 in interaction with the first and second sensors 19, 20, the sensor 25 for measuring the coolant temperature, the pump 3 in the main circuit 1, the unit 4, 5, 6 for cooling or heating the coolant in the main circuit 1, and the first and second pumps 17, 18.

It should be stated that if the temperature t of the coolant is not within the ranges a-b and c-d, this will be interpreted by the control unit 21 as an indication that sufficient heating or cooling of the first component 8 or second component 13 is not achieved by control of the first and second pumps 17, 18 alone, but that added functionality of the pump 3 in the main circuit 1 and the unit 4, 5, 6 for cooling or heating the coolant in the main circuit 1 is needed.

Although the invention has been exemplified only by showing an embodiment in which there are only two sub-circuits it should be understood that the intended scope of protection also includes solutions in which there are numerous such sub-circuits, and by means of which the temperature of a plurality of components, including batteries, are controlled. Controlling the temperature of a component also includes controlling the temperature of a mass of gas or liquid, preferably by controlling the temperature of a component that in its turn affects the temperature of the mass of gas or liquid.

It should be added that of course, the claimed scope of protection also covers designs in which there are further components/parts in each respective circuit. Such components/parts may be provided serially or in parallel with the components/parts that have been disclosed in this disclosure.

The invention claimed is:

1. A temperature control system for a vehicle, comprising:
   a main circuit comprising a tubing in which there is provided a coolant, a main circuit pump configured to pump said coolant through a tubing of the main circuit in a first direction, and at least one unit for cooling or heating the coolant in the main circuit;
   a first sub-circuit for cooling or heating a first component, said first sub-circuit comprising a tubing that has a first end and a second end, which are connected to respective openings in the tubing of the main circuit at positions that are spaced apart from each other as seen in a longitudinal direction of the tubing of the main circuit, wherein the first end is connected to the tubing of the main circuit at a position upstream of the position at which the second end is connected to the tubing of the main circuit as seen in said first direction;
   at least one second sub-circuit for cooling or heating a second component, said at least one second sub-circuit comprising a tubing that has a first end and a second end, which are connected to respective openings in the tubing of the main circuit at positions that are spaced apart from each other as seen in a longitudinal direction of the tubing of the main circuit, wherein the first end is connected to the tubing of the main circuit at a position upstream the position at which the second end is connected to the tubing of the main circuit as seen in said first direction,
   wherein the first sub-circuit comprises a first pump configured to pump a coolant in a direction from said first end of the tubing of the first sub-circuit to the second end thereof,
   wherein the at least one second sub-circuit comprises a second pump configured to pump a coolant in a direction from said first end of the tubing of the at least one second sub-circuit to the second end thereof, and
   wherein the first end of the first sub-circuit and the first end of the at least one second sub-circuit are joined to a common tubing section which in its turn is connected to the tubing of the main circuit; and
   a control unit configured in at least one mode to control an output, as measured in volume per time unit, of each of the main circuit pump, the first pump of the first sub-circuit, and the second pump of the at least one second sub-circuit, such that a sum of an output of the first pump of the first sub-circuit and an output of the second pump of the at least one second sub-circuit exceeds an output of the main circuit pump.

2. A temperature control system according to claim 1, wherein said common tubing section has a length which is sufficient for mixing in said common tubing section a flow of coolant delivered by the main circuit pump and a flow of coolant delivered by said first pump of the first sub-circuit and by said second pump of the at least one second sub-circuit such that a temperature of the coolant is homogenous at an end of the common tubing section where the first and second sub-circuits depart from each other.

3. A temperature control system according to claim 1 further comprising:
   a first sensor configured to measure a parameter reflecting a temperature $t_1$ of said first component; and
   a second sensor configured to measure a parameter reflecting a temperature $t_2$ of said second component,
   wherein the control unit is connected to the first sensor and to the second sensor and, wherein the control unit is further configured to control operation of the first pump on basis of input received from the first sensor and to control operation of the second pump on basis of input received from the second sensor.

4. A temperature control system according to claim 3, wherein the control unit is connected to the pump of the main circuit and to the at least one unit for cooling or heating the coolant in the main circuit and is configured to control the operation of the pump of the main circuit and said unit for cooling or heating the coolant in the main circuit on basis of input received from the first sensor and the second sensor.

5. A temperature control system according to claim 4, wherein the control unit is configured to activate the pump of the main circuit and/or said unit for cooling or heating the coolant in the main circuit, as a response to input received from said first or second sensor, or from a sensor that measures a temperature of the coolant in the first sub-circuit and the at least one second sub-circuit, that indicates that sufficient heating or cooling of the first component or second component is not achieved by control of the first and second pump.

6. A temperature control system according to claim 1, wherein the pump of the main circuit has a lower maximum output, measured in units of fluid per minute, than a sum of a maximum output of the first and second pumps.

7. A temperature control system according to claim 1, wherein a portion of the tubing of the main circuit that presents the openings to which first and second ends of the first sub-circuit and the at least one second sub-circuit are connected is separable from an upstream part of said tubing and a downstream part of said tubing by means of tubing connections via which it is connected to said upstream part and downstream part, respectively.

8. A temperature control system according to claim 1, wherein said first component and said second component are components of a vehicle.

9. A temperature control system according to claim 8, wherein at least one of the first component and the second component is a battery for the accumulation of electric energy.

10. A temperature control system according to claim 1, wherein the first component has a preferred operation temperature range a-b, and the second component has a preferred operation temperature range c-d, and that a-b overlaps c-d.

11. A vehicle, comprising:
    a first component which has a preferred operating temperature range a-b;
    at least one second component which has a preferred operating temperature range c-d; and
    a temperature control system comprising:
       a main circuit comprising a tubing in which there is provided a coolant, a main circuit pump configured to pump said coolant through the tubing of the main circuit in a first direction, and at least one unit for cooling or heating the coolant in the main circuit;

a first sub-circuit for cooling or heating the first component, said first sub-circuit comprising a tubing that has a first end and a second end, which are connected to respective openings in the tubing of the main circuit at positions that are spaced apart from each other as seen in a longitudinal direction of the tubing of the main circuit, wherein the first end is connected to the tubing of the main circuit at a position upstream the position at which the second end is connected to the tubing of the main circuit as seen in said first direction;

at least one second sub-circuit for cooling or heating the second component, said second sub-circuit comprising a tubing that has a first end and a second end, which are connected to respective openings in the tubing of the main circuit at positions that are spaced apart from each other as seen in a longitudinal direction of the tubing of the main circuit, wherein the first end is connected to the tubing of the main circuit at a position upstream the position at which the second end is connected to the tubing of the main circuit as seen in said first direction, wherein the first sub-circuit comprises a first pump configured to pump a coolant in a direction from said first end of the tubing of the first sub-circuit to the second end thereof, wherein the at least one second sub-circuit comprises a second pump configured to pump a coolant in a direction from said first end of the tubing of the at least one second sub-circuit to the second end thereof, and wherein the first end of the first sub-circuit and the first end of the at least one second sub-circuit are joined to a common tubing section which in its turn is connected to the tubing of the main circuit; and a control unit configured in at least one mode to control an output, as measured in volume per time unit, of each of the main circuit pump, the first pump of the first sub-circuit, and the second pump of the at least one second sub-circuit, such that a sum of an output of the first pump of the first sub-circuit and an output of the second pump of the at least one second sub-circuit exceeds an output of the main circuit pump, wherein the first component is provided in connection to the first sub-circuit and configured to be heated or cooled by heat exchange with coolant flowing through the first sub-circuit, and wherein the second component is provided in connection to the at least one second sub-circuit and configured to be heated or cooled by heat exchange with coolant flowing through the at least one second sub-circuit.

12. A vehicle according to claim 11, wherein said first component and second component is any one of:
a battery for accumulation of electric energy;
a compressor;
an electric heater device;
a condenser; and
power electronics.

13. A vehicle according to claim 12, wherein at least one of the first and second component is a battery for the accumulation of electric energy.

14. A method of controlling the operation of a temperature control system comprising:
a main circuit comprising a tubing in which there is provided a coolant, a main circuit pump configured to pump said coolant through a tubing of the main circuit in a first direction, and at least one unit for cooling or heating the coolant in the main circuit;

a first sub-circuit for cooling or heating a first component, said first sub-circuit comprising a tubing that has a first end and a second end, which are connected to respective openings in the tubing of the main circuit at positions that are spaced apart from each other as seen in a longitudinal direction of the tubing of the main circuit, wherein the first end is connected to the tubing of the main circuit at a position upstream of the position at which the second end is connected to the tubing of the main circuit as seen in said first direction;

at least one second sub-circuit for cooling or heating a second component, said at least one second sub-circuit comprising a tubing that has a first end and a second end, which are connected to respective openings in the tubing of the main circuit at positions that are spaced apart from each other as seen in a longitudinal direction of the tubing of the main circuit, wherein the first end is connected to the tubing of the main circuit at a position upstream the position at which the second end is connected to the tubing of the main circuit as seen in said first direction, wherein the first sub-circuit comprises a first pump configured to pump a coolant in a direction from said first end of the tubing of the first sub-circuit to the second end thereof, wherein the at least one second sub-circuit comprises a second pump configured to pump a coolant in a direction from said first end of the tubing of the at least one second sub-circuit to the second end thereof, and wherein the first end of the first sub-circuit and the first end of the at least one second sub-circuit are joined to a common tubing section which in its turn is connected to the tubing of the main circuit; and a control unit configured in at least one mode to control an output, as measured in volume per time unit, of each of the main circuit pump, the first pump of the first sub-circuit, and the second pump of the at least one second sub-circuit, such that a sum of an output of the first pump of the first sub-circuit and an output of the second pump of the at least one second sub-circuit exceeds an output of the main circuit pump, said method comprising the following steps:
measuring a parameter reflecting a temperature $t_1$ of a first component;
comparing the measured parameter to a preferred operational temperature range a-b of the first component;
controlling the output of the first pump on basis of said comparison such that $a<t_1<b$;
measure a parameter reflecting a temperature $t_2$ of a second component;
comparing the measured parameter to a preferred operational temperature range c-d of the second component;
controlling the output of the second pump on basis of said comparison such that $c<t_2<d$; and
repeating said steps continuously.

15. A method of controlling the operation of a temperature control system comprising:
a main circuit comprising a tubing in which there is provided a coolant, a main circuit pump configured to pump said coolant through the tubing of the main circuit in a first direction, and at least one unit for cooling or heating the coolant in the main circuit;
a first sub-circuit for cooling or heating a first component, said first sub-circuit comprising a tubing that has a first end and a second end, which are connected to respective openings in the tubing of the main circuit at positions that are spaced apart from each other as seen in a longitudinal direction of the tubing of the main circuit, wherein the first end is connected to the tubing of the main circuit at a position upstream the position at which the second end is connected to the tubing of the main circuit as seen in said first direction; and at least one second sub-circuit for cooling or heating a second component, said at least one second sub-circuit comprising a tubing that has a first end and a second end, which are connected to respective openings in the tubing of the main circuit at positions that are spaced apart from each other as seen in a longitudinal direction of the tubing of the main circuit, wherein the first end is connected to the tubing of the main circuit at a position upstream the position at which the second end is connected to the tubing of the main circuit as seen in said first direction, wherein the first sub-circuit comprises a first pump configured to pump a coolant in a direction from said first end of the tubing of the first sub-circuit to the second end thereof, wherein the at least one second sub-circuit comprises a second pump configured to pump a coolant in a direction from said first end of the tubing of the at least one second sub-circuit to the second end thereof, and wherein the first end of the first sub-circuit and the first end of the at least one second sub-circuit are joined to a common tubing section which in its turn is connected to the tubing of the main circuit, said method comprising the following steps:

measuring a parameter reflecting a temperature $t_1$ of a first component;

comparing the measured parameter to a preferred operational temperature range a-b of the first component;

controlling the output of the first pump on basis of said comparison such that $a<t_1<b$;

measure a parameter reflecting a temperature $t_2$ of a second component;

comparing the measured parameter to a preferred operational temperature range c-d of the second component;

controlling the output of the second pump on basis of said comparison such that $c<t_2<d$;

repeating said steps continuously; and if any of the conditions $a<t_1<b$ or $c<t_2<d$ is not achieved by means of control of the output of the first pump or the second pump, controlling the operation of the pump of the main circuit and the operation of the unit for cooling or heating the coolant in the main circuit in addition to controlling the output of the first and second pump such that $a<t_1<b$ and $c<t_2<d$.

16. A temperature control system for a vehicle, comprising:

a main circuit comprising a tubing in which there is provided a coolant, a main circuit pump configured to pump said coolant through the tubing of the main circuit in a first direction, and at least one unit for cooling or heating the coolant in the main circuit;

a first sub-circuit for cooling or heating a first component, said first sub-circuit comprising a tubing that has a first end and a second end, which are connected to respective openings in the tubing of the main circuit at positions that are spaced apart from each other as seen in a longitudinal direction of the tubing of the main circuit, wherein the first end is connected to the tubing of the main circuit at a position upstream the position at which the second end is connected to the tubing of the main circuit as seen in said first direction; and at least one second sub-circuit for cooling or heating a second component, said at least one second sub-circuit comprising a tubing that has a first end and a second end, which are connected to respective openings in the tubing of the main circuit at positions that are spaced apart from each other as seen in a longitudinal direction of the tubing of the main circuit, wherein the first end is connected to the tubing of the main circuit at a position upstream the position at which the second end is connected to the tubing of the main circuit as seen in said first direction, wherein the first sub-circuit comprises a first pump configured to pump a coolant in a direction from said first end of the tubing of the first sub-circuit to the second end thereof, wherein the at least one second sub-circuit comprises a second pump configured to pump a coolant in a direction from said first end of the tubing of the at least one second sub-circuit to the second end thereof, wherein the first end of the first sub-circuit and the first end of the at least one second sub-circuit are joined to a common tubing section which in its turn is connected to the tubing of the main circuit, and wherein the pump of the main circuit has a lower maximum output, measured in units of fluid per minute, than a sum of a maximum output of the first and second pumps.

17. A temperature control system for a vehicle, comprising:

a main circuit comprising a tubing in which there is provided a coolant, a main circuit pump configured to pump said coolant through the tubing of the main circuit in a first direction, and at least one unit for cooling or heating the coolant in the main circuit;

a first sub-circuit for cooling or heating a first component, said first sub-circuit comprising a tubing that has a first end and a second end, which are connected to respective openings in the tubing of the main circuit at positions that are spaced apart from each other as seen in a longitudinal direction of the tubing of the main circuit, wherein the first end is connected to the tubing of the main circuit at a position upstream the position at which the second end is connected to the tubing of the main circuit as seen in said first direction; and at least one second sub-circuit for cooling or heating a second component, said at least one second sub-circuit comprising a tubing that has a first end and a second end, which are connected to respective openings in the tubing of the main circuit at positions that are spaced apart from each other as seen in a longitudinal direction of the tubing of the main circuit, wherein the first end is connected to the tubing of the main circuit at a position upstream the position at which the second end is connected to the tubing of the main circuit as seen in said first direction, wherein the first sub-circuit comprises a first pump configured to pump a coolant in a direction from said first end of the tubing of the first sub-circuit to the second end thereof, wherein the at least one second sub-circuit comprises a second pump configured to pump a coolant in a direction from said first end of the tubing of the at least one second sub-circuit to the second end thereof, wherein the first end of the first sub-circuit and the first end of the at least one second sub-circuit are joined to a common tubing section which in its turn is connected to the tubing of the main circuit, and wherein a portion of the tubing of the main circuit that presents the openings to which first and second ends of the first sub-circuit and the at least one second sub-circuit are connected is separable from an upstream part of said tubing and a downstream part of said tubing by means of tubing connections via which it is connected to said upstream part and downstream part, respectively.

\* \* \* \* \*